Dec. 9, 1924.
H. V. CARMANS
BOLL WEEVIL DESTROYER
Filed April 12, 1923     4 Sheets-Sheet 1
1,518,305
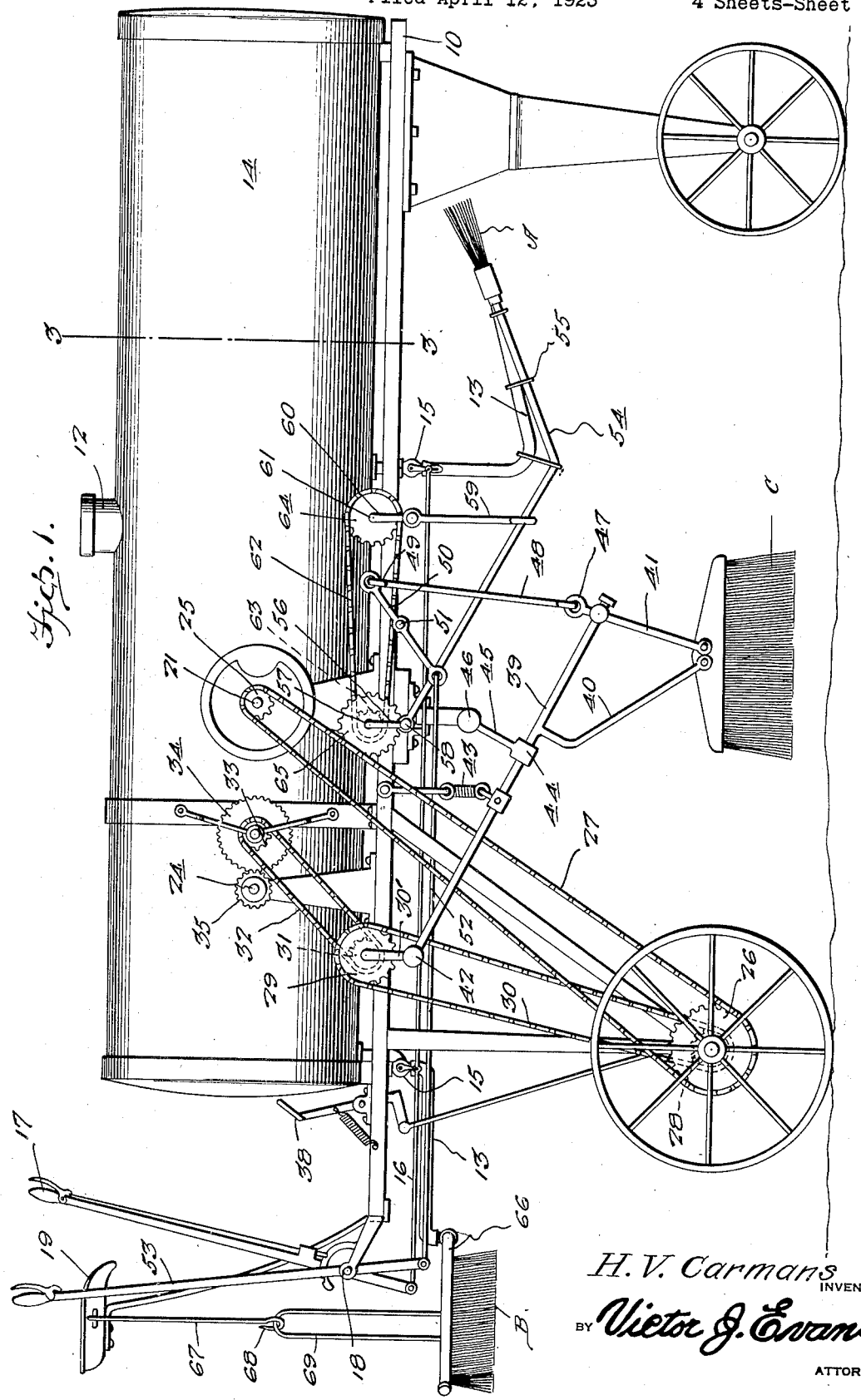
H. V. Carmans
INVENTOR
BY Victor J. Evans
ATTORNEY

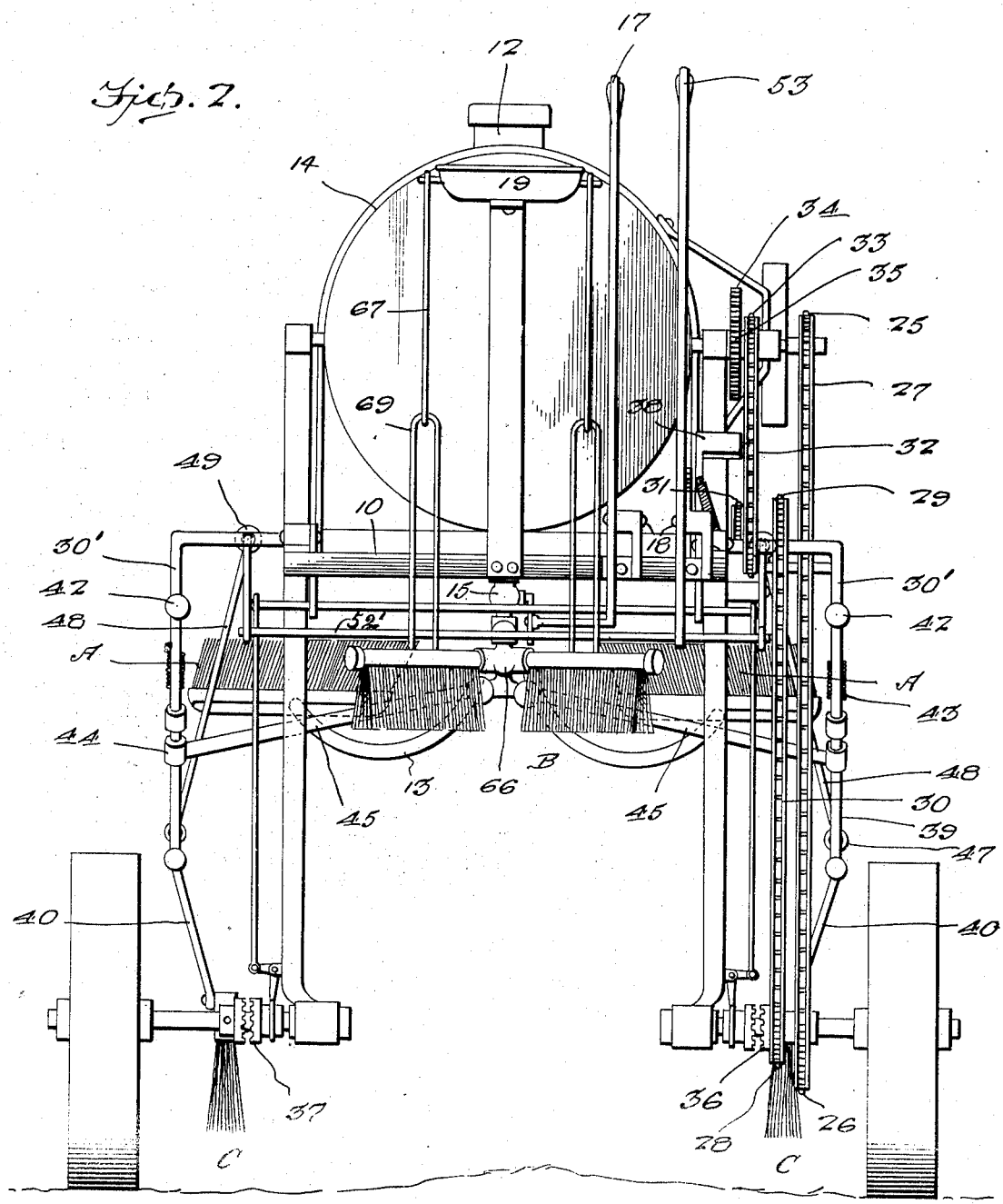

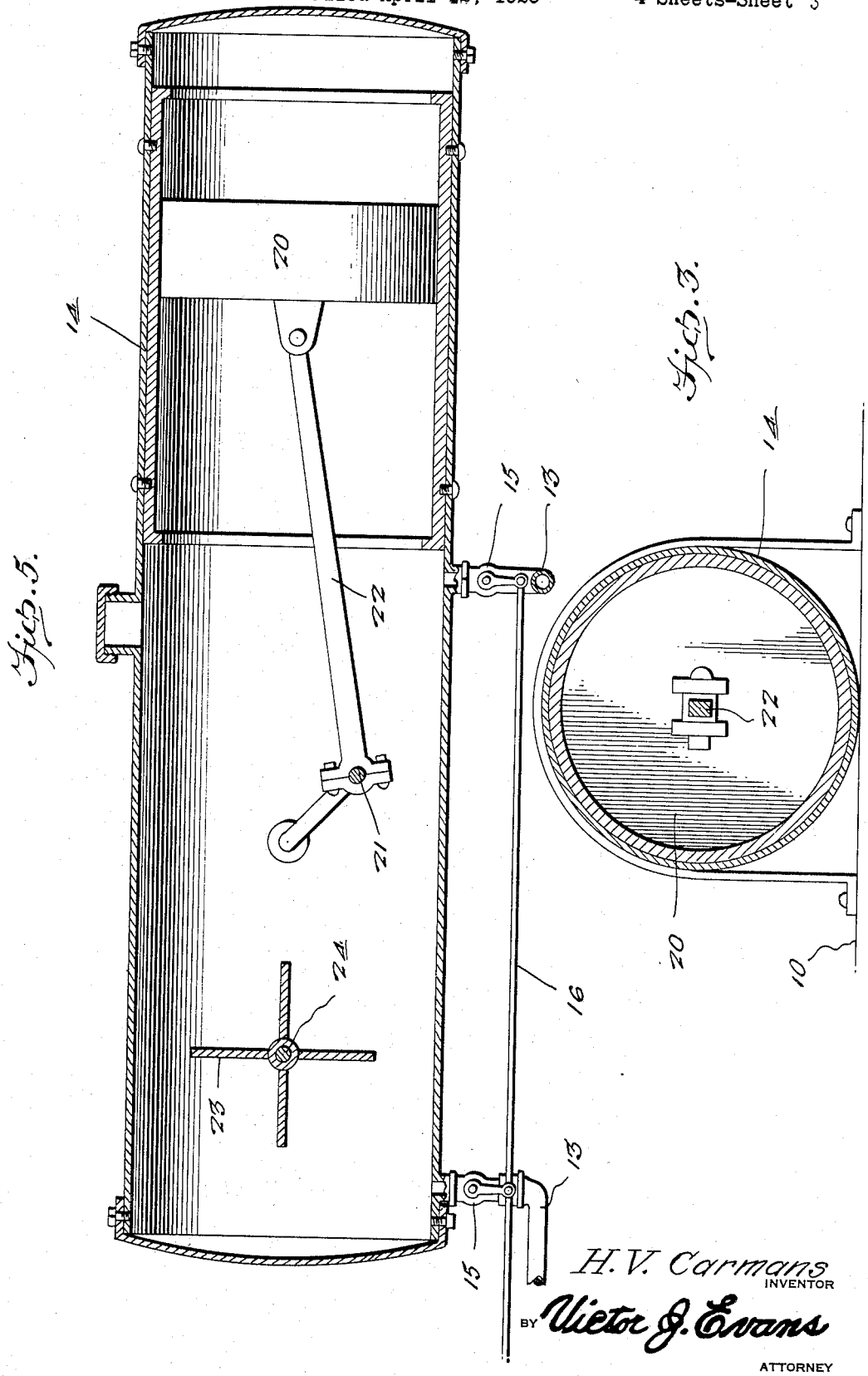

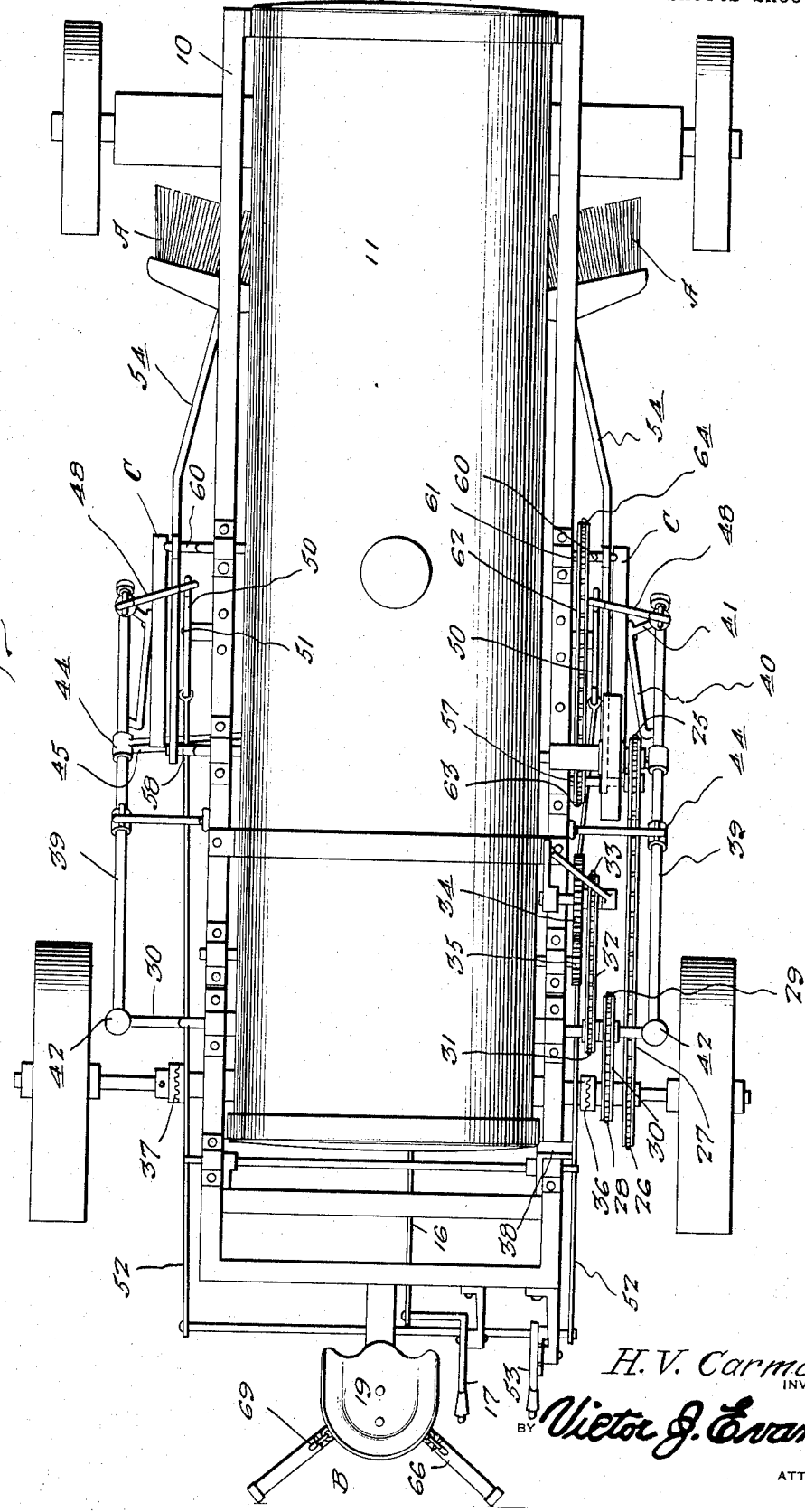

Patented Dec. 9, 1924.

1,518,305

UNITED STATES PATENT OFFICE.

HAVANAR V. CARMANS, OF SHERMAN, TEXAS, ASSIGNOR OF ONE-EIGHTH TO THOMAS A. PETTY, OF BRISTOW, OKLAHOMA, AND ONE-FOURTH TO LEE G. PURKEY AND ONE-FOURTH TO CLARENCE C. PURKEY, BOTH OF SHERMAN, TEXAS.

BOLL-WEEVIL DESTROYER.

Application filed April 12, 1923. Serial No. 631,725.

*To all whom it may concern:*

Be it known that I, HAVANAR V. CARMANS, a citizen of the United States, residing at Sherman, in the State of Texas, have invented new and useful Improvements in Boll-Weevil Destroyers, of which the following is a specification.

This invention contemplates the provision of a machine for killing boll weevils and other insects which destroy cotton plants and the like, and embodies amongst other features, a plurality of brushes arranged to brush the plants and the ground about the latter, and to simultaneously saturate the same with a solution which will destroy said insects without any detrimental effect to the plants.

In carrying out the invention, I provide a novel construction of means for operating the brushes for the purpose specified, and for conveying the solution thereto from a supply tank forming part of the machine.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the machine.

Figure 2 is a rear end elevation.

Figure 3 is a sectional view taken on the line 3—3 of Figure 1.

Figure 4 is a top plan view.

Figure 5 is a longitudinal sectional view.

Referring to the drawings in detail, 10 indicates a wheeled frame, which supports a liquid supply tank 14 arranged longitudinally of the frame, and from which liquid is conveyed to the brushes to be hereinafter described. The tank 14 is provided with a filling tube 12 normally closed by a cover of any suitable construction.

Arranged beneath the frame is a plurality of brushes adapted to be utilized for the purpose herein above stated, and these brushes are arranged in pairs indicated at A, B and C respectively. The brushes of the pair A are arranged adjacent the forward end of the machine, while the brushes B are arranged in divergent relation at the rear of the machine, while the brushes C are arranged intermediate the machine adjacent the sides thereof and adapted to be moved toward each other, so that the insects brushed from the plants onto the ground are subsequently brushed toward the center by the brushes C, where they can be saturated with the solution from the tank conveyed to the brushes B. The head of each brush A and B is formed to provide a compartment, and communicates with a supply tube 13, which conveys the solution from the tank 14 to the respective brushes. These tubes 13 are of course flexible and are suitably coupled to the tank 14 by means of valve casings 15. A valve is arranged to operate in each valve casing so as to control the communication between the tank and the different supply tubes leading to the various brushes, and these valves are simultaneously operated by means of a rod 16, which is reciprocated incident to the operation of the lever 17. This lever is fulcrumed as at 18 and is arranged within convenient reach of the operator of the machine, or in other words immediately at one side of the seat 19. It is of course to be understood that the solution is sprayed from the brushes under pressure, inasmuch as the solution is forced from the tank under pressure by means of piston 20. This piston is operated by a crank shaft 21 to which it is connected by means of the piston rod 22. The ingredients of liquid or solution is thoroughly mixed by means of an agitator 23 which is mounted upon a shaft 24 and rotated in a manner to be hereinafter described. The piston rod is reciprocated from the crank shaft which is rotated incident to the progression of the machine.

As will be noted from the drawings, the crank shaft 21 is provided with a small sprocket 25 over which and a larger sprocket 26 mounted on the axle supporting one of the traction wheels is an endless chain 27. Arranged adjacent the sprocket wheel 26, is a smaller sprocket wheel 28 over which and a larger sprocket wheel 29 is trained an endless chain 30. The shaft upon which the sprocket wheel 29 is mounted is provided with a crank portion 30' for a purpose to be hereinafter described, and this shaft also supports a smaller sprocket wheel 31 over which is trained an endless chain 32. This chain is also trained over a small sprocket wheel 33 which is fixed upon the same axis with the large sprocket wheel 34, so that these two latter mentioned wheels rotate in unison with the large sprocket wheel 34 meshing with a small sprocket wheel 35 carried by the shaft 24 of the agitator. So while the machine is moving over the ground, the various parts above described can be instantly put into operation by simply engaging the clutch members 36 and 37 respectively which are actuated in the usual manner through the instrumentality of the clutch pedal 38.

Connected to the crank portions 30', and arranged at opposite sides of the machine, are rods 39 adapted to be reciprocated incident to the rotation of the crank portions 30', and thus impart movement to the brushes C with which they are connected. The brushes are connected by branches 40 and 41 projecting from each rod 39 as clearly illustrated in Figure 1. These rods 39 are however associated with the crank portions 30' by ball and socket connections 42, allowing the rods to be rotated toward and away from each other under the influence of the springs 43 connected with the rods 39 at appropriate points in their lengths. The rods 39 turn the bearings 44 which are supported by the ends of transverse rods 45, the latter having ball and socket connections 46 with a suitable support arranged beneath the machine as clearly shown in Figure 2. The upper end of each branch 41 of the respective rods 39 terminates to provide a loop or eye 47 which accommodate the adjacent end of a vertical rod 48, the upper end of which is connected as at 49 with a link 50 fulcrumed at 51 between the ends thereof. This link 50 has its opposite end connected with a link 52 which is moved through the medium of a transverse bar 52' by an operating lever 53 arranged at one side of the driver's seat in convenient reach of the operator. Manifestly, by operating the lever 53, the link 50 is swung upon its fulcrum for the purpose of raising or lowering the brushes C toward or away from the ground as the occasion may require. It is of course to be understood that the brushes C at the opposite sides of the machine are simultaneously operated incident to the movement of the lever 53. The construction of this part of the machine is such that the brushes C are operated in the manner to brush the insects, which have been previously brushed from the plants upon the ground by the brushes A, into the path of movement of the brushes B which are arranged to follow the brushes C so that the insects will be sprayed with the solution conveyed to the brushes B from the tank 14.

As above stated, the insects are brushed from the plants onto the ground by the brushes A which are of course arranged adjacent the front of the machine and mounted to be swung in a vertical plane for this purpose in contra-distinction to the lateral or swinging movement of the brushes C. The brushes A are supported by rods 54 which are held associated with the flexible tubing 13 in any suitable manner, preferably by clamps 55. The rods 54 have corresponding extremities connected with the crank portions 56 of shafts 57 as indicated at 58, and are also connected or supported by vertical rods 59 which depend from the crank portions 60 of shaft 61. The shafts 57 and 61 are rotated in unison in a manner to be presently described, and consequently the rods 54 are given a vertical movement for the purpose of brushing the plants with the brushes A and at the same time spray the plants with the solution from the tank 14. Now, the shaft 61 is rotated from the shaft 57 through the instrumentality of an endless chain 62 which is trained over a sprocket wheel 63 fixed upon the shaft 57 and over a larger sprocket wheel 64 carried by the shaft 61. The shaft 57 further supports a larger sprocket wheel 65 arranged to engage the adjacent run of the endless chain 27, so that the shaft is operated from this chain simultaneously with the operation of the piston within the tank 14. The branches B are at the rear of the machine arranged in divergent relation and remain stationary being supported from a suitable bracket 66 shown in Figure 2. This bracket 66 is suitably connected with the flexible tubing or hose 13 which conveys the solution from the tank 14 to these brushes B. The brushes are suspended from the seat 19 by vertical rods 67 terminating in hooks 68 which receive and support the yoke 69 for this purpose.

In practice the machine is moved over the ground or surface in any suitable manner and during the progression of the machine the brushes A move in vertical planes to brush the plants, and at same time spray the latter with the solution or liquid conveyed to the brushes from the tank 14. It is during this operation that the insects are brushed from the plants onto the ground, and these insects are subsequently brushed toward the center of the machine by the brushes C, which are operated in the manner above described, laterally or at right angles to the brushes A. The insects are subsequently sprayed with the solution forced from the tank 14 through the brushes B which also subsequently spray the plants as these brushes occupy positions approximately in planes between the brushes C for this purpose. These brushes are thus arranged to sweep the top of the plants.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A machine of the character described comprising a wheeled frame, a liquid supply tank supported thereon, a pair of aligned brushes arranged adjacent the front of said machine and adapted to sweep insects from plants, means for supplying each brush with a liquid from said tank, adjustable mounting means for said brushes, additional brushes arranged at the rear of the machine and adapted to sweep and spray the top of said plants and brushes disposed upon opposite sides of the machine as and for the purpose specified.

2. A machine of the character described comprising a wheeled frame, a liquid supply tank supported thereon, brushes movable at right angles to each other and arranged to sweep plants and the ground in the vicinity of the plants as the machine is moved over the surface, means for supplying some of said brushes with liquid from said tank under pressure, and adjusting means for said brushes.

3. A machine for killing insects which destroy plants comprising a wheeled frame, a liquid supply tank supported thereon, brushes arranged in pairs, means for supplying one pair of said brushes with a solution from said tank, and this last mentioned pair of brushes being mounted for vertical movement to brush the plants, another pair of said brushes being mounted for lateral movement and adapted to contact the ground adjacent the plants, means for operating said brushes, and a third pair of said brushes being arranged at the rear of the machine and communicating with said tank, said last named brushes being disposed to sweep the tops of said plants.

4. A machine of the character described comprising a wheeled frame, a liquid supply tank supported thereon, fountain brushes arranged beneath said tank adjacent the front of the machine, means for conveying the liquid from said tank to said brushes, means for moving said brushes in a manner to sweep the plants vertically incident to the progression of the machine, brushes arranged upon opposite sides of the machine in alignment with each other, means for imparting lateral motion to the last mentioned brushes which contact the ground adjacent the plants, means for lifting and lowering the latter mentioned brushes, and additional stationary fountain brushes arranged at the rear of the machine to finally sweep and saturate the tops of said plants.

In testimony whereof I affix my signature.

HAVANAR V. CARMANS.